(No Model.)
D. E. COULSON.
SLIP JOINT AND COUPLING FOR DENTAL ENGINES.
No. 430,420. Patented June 17, 1890.
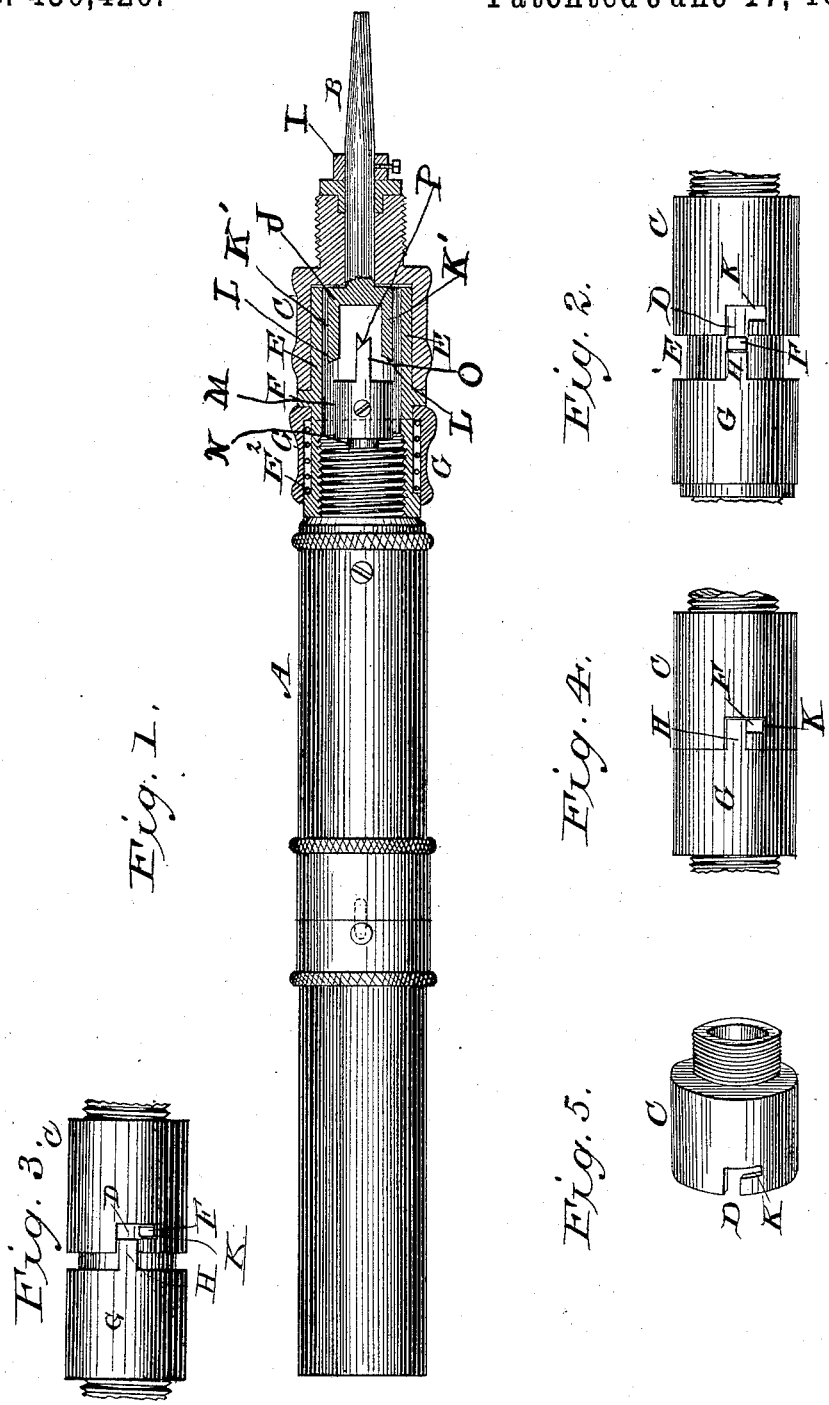
Witnesses
H. C. Newman.
E. S. Newman.
Inventor
D. E. Coulson,
By his Attorneys
Hopkins Atkins

UNITED STATES PATENT OFFICE.

DAVID E. COULSON, OF GALESBURG, ILLINOIS.

SLIP JOINT AND COUPLING FOR DENTAL ENGINES.

SPECIFICATION forming part of Letters Patent No. 430,420, dated June 17, 1890.

Application filed August 16, 1889. Serial No. 321,021. (No model.)

*To all whom it may concern:*

Be it known that I, DAVID E. COULSON, of Galesburg, in the county of Knox and State of Illinois, have invented certain new and useful Improvements in Slip Joints and Couplings, of which the following is a specification, reference being had to the accompanying drawings.

The object of my invention is to provide a quick, convenient, and secure means of connecting working-tools with handles or revolving shafts, particularly flexible shafts, such as used in dental engines; but my device may be applied to other uses.

My invention relates to providing each of a series of tools to be attached to a handle or driving part in operative relation thereto with a sleeve having one or more right-angular slots in it somewhat like a "bayonet-joint," and also relates to providing spring-locking mechanism such as hereinafter described upon the handle or driving part, adapted to engage in the bayonet-joint and lock the sleeve to the handle or driving part.

The order of applying the parts of my invention to a shaft and instrument may be of course reversed if desired.

In the accompanying drawings, Figure 1 is an elevation of a dental hand-piece with my improvement attached, shown partly in section. Fig. 2 shows my improved coupling in the unlocked position. Fig. 3 shows the coupling in the position of being locked, and Fig. 4 shows it in the locked position. Fig. 5 illustrates one part of my coupling detached.

Referring to the letters upon the drawings, A represents a dental hand-piece of any ordinary kind, which I will not describe in detail, as it forms no material part of my invention.

B represents a shaft secured within a sleeve C, and is adapted to be fastened to a flexible coil or cable of a dental engine.

The sleeve C is provided with a right-angular slot D. This sleeve is adapted to slide over the end of a tube or rod E, provided with a lug F.

G represents another sleeve, adapted to loosely slide on the tube or rod E, and provided with a spring $E^2$, which presses the sliding sleeve toward the sleeve C.

H is another lug, projecting from one end of the sliding sleeve G, in line with lug F, and bearing against the same. There may be two or more lugs F, two or more right-angular slots, and two or more lugs H, if desired.

The shaft B revolves within the sleeve C, and is restrained from moving endwise by the collar I, secured to it. Upon the end of said shaft within the tube E is provided a disk or head J, which carries on opposite sides at its circumference two lugs K' K'. L L indicate bevel edges on the ends of said lugs.

M indicates a collar secured to the shaft N of the hand-piece A, and provided with lugs O to correspond with the lugs K' K', which in use they impinge against.

P indicates bevel edges on the ends of the lugs O. The object of the bevel edges above described is to afford certain means of uniting the two parts of the coupling at any point.

The operation of my improvement is as follows: The hand-piece and the shaft secured to the sleeve are placed in position, as shown in Fig. 2; then the lugs F and H, being in alignment, are inserted into the right-angular slot; then the sleeve C is turned so that the lug F will enter the part K of the right-angular slot, as shown in Fig. 3. The spring $E^2$ will then force the sliding sleeve G forward, thrusting the lug H in behind the lug F, and locking it in place, as shown in Fig. 4. The sleeve C, carrying the tool, can thus be instantly applied and locked in place or unlocked and detached at will. An operating-tool of any sort, whether designed to rotate or not, can thus be instantly applied, and where there are a variety of tools to be worked one at a time in connection with a hand-piece or driving part my improved connecting and locking mechanism will be found to be very useful. When the sleeves C and G have been fastened together, as above described, the ends of the lugs O and K' K' are in juxtaposition within the tube E. If now the shaft B is set in motion, the lugs K' K' are caused to revolve and impinge against the lugs O, and thereby rotate the shaft N. The operation of the lugs against each other insures a direct center draft of the shaft B on the shaft N, and absolutely excludes the possibility of binding at this place.

Some modifications in the forms of the parts of my device may be made without departing from the substance of my invention. For example, neither of the sleeves, as shown, need necessarily be a complete sleeve entirely encircling the tube or rod. Any form of parts corresponding substantially in function and relation to those I have illustrated would of course serve the purpose of my fastening appliances equally as well.

What I claim is—

The combination, with a tube or rod E, having a lug F, of a detachable sleeve C, having a right-angular slot D, and a spring-actuated sliding sleeve G, having a lug H, substantially as set forth.

In testimony of all which I have hereunto subscribed my name.

DAVID E. COULSON.

Witnesses:
   JOSEPH L. ATKINS,
   S. G. HOPKINS.